May 31, 1949.    B. SPECTER ET AL    2,471,552
CHART
Filed July 24, 1946
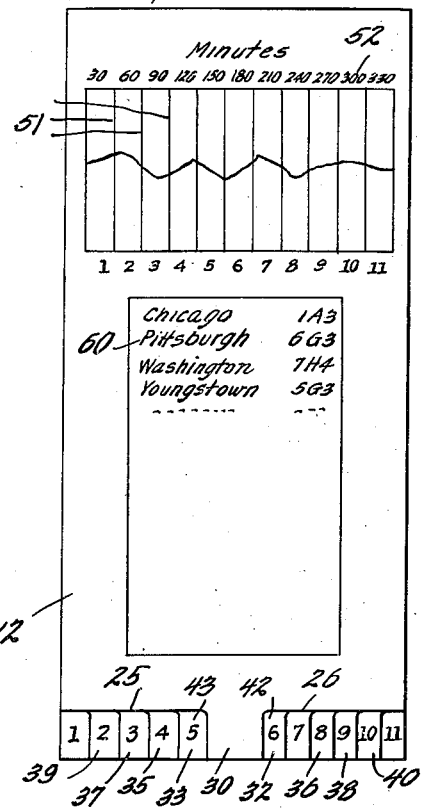
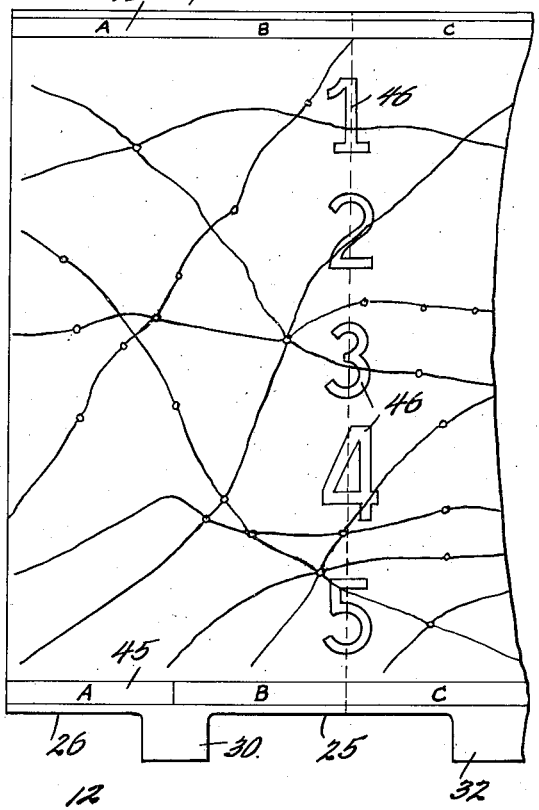
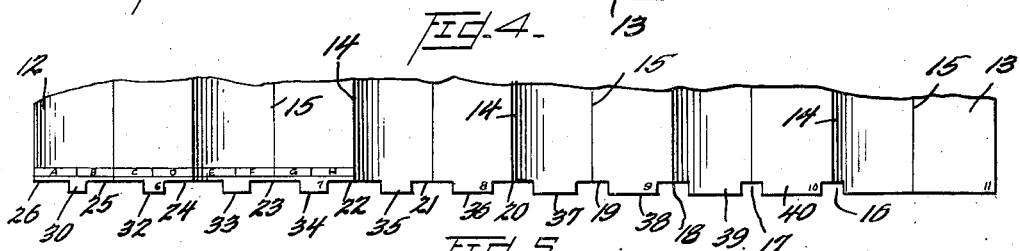
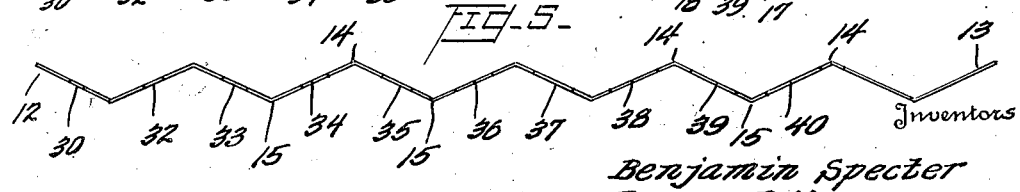
Inventors
Benjamin Specter
James J. Murray
By J. Richard Paris   Attorney Patented May 31, 1949

2,471,552

UNITED STATES PATENT OFFICE 2,471,552

CHART

Benjamin Specter and James J. Murray,
Washington, D. C.

Application July 24, 1946, Serial No. 685,895

4 Claims. (Cl. 283—35)

The present invention relates generally to folded charts provided with means to facilitate the use of such charts. The invention is more particularly directed to zigzag folding charts which offer the advantage of ready accessibility to the several sections or panels of the chart without spreading the entire chart wide open.

The preferred embodiment of the present invention and as applied to a zigzag folded map or chart having a chart or map on both sides of the sheet consists in providing the bottom edge of the sheet with a series of cut out portions at the bottom of each fold line. Such cut out portions may preferably be equally divided on each side of the fold line and, while they may have any suitable shape, they are preferably elongated along the bottom of the sheet and comparatively short—about a half inch—in the vertical direction. The length or dimension of the cut out along the bottom edge regularly increases from one end of the sheet to the other with the result that when the sheet is viewed in its folded condition, a small square portion of each section of the map or chart is exposed to view. Such portions bear the numbers of the respective sections and, being integral with the remote panel of each section, they serve as finger holds for turning the desired section to open position.

In the drawings Figure 1 is a face view of the folded chart. Figure 2 is an end view of the folded chart. Figure 3 is a face view of a section of the map. Figure 4 is a face view of the map fully open. Figure 5 is an end view of Figure 4.

When a zigzag folded map is opened, two adjacent panels are open to view. Such a pair of panels are herein referred to as a section. For the purposes of the present invention each section is assigned a number. The number of sections will vary with the size of the map. Each such section will have one dimension equal to one dimension of the map, preferably the smaller, and the other dimension of each section should preferably be from six to eight inches; i. e., the width of each panel may be from three to four inches, or any other suitable dimension which constitutes an aliquot part of the overall dimension of the sheet. Each section will now be seen to comprise a pair of adjacent panels facing each other and divided by a fold line between them.

Referring to the drawings which are illustrative of a preferred embodiment of the present invention, the map or chart will be seen to consist of a sheet divided into a plurality of panels folded in zigzag fashion. The front cover panel 12 may bear on its outer face an index or other printed data and, similarly, the outer face of the rear panel 13 may also bear any desired printed data.

As illustrated in the present drawing, the sheet has a map or chart on both faces; the present invention is, however, also advantageously applicable to single face maps.

In the double faced map shown herein, one face, the front face, is shown as bearing the map over all twelve panels, and the back face bears the map over ten panels, leaving the two exposed faces of front and rear panels 12 and 13 to be employed for other purposes. Thus the back face map is divided into five sections numbered 1 to 5, each section consisting of two adjacent panel faces folded over each other, and the front face map is divided into 6 sections numbered 6 to 11.

The front face is shown in Figure 4 in its extended condition and it will be seen that each section comprises a pair of inner faces of a pair of adjacent panels disposed between a pair of upwardly directed crease lines 14 or between such a crease line and the edge of the sheet. These sections are seen as numbered 6 to 11 inclusive. Figure 4 also shows the map sections on the back face of the sheet, which will be seen as each consisting of a pair of panel faces disposed between each pair of downwardly directed crease lines 15. The numbers 1 to 5, inclusive, of these sections are shown in Figure 4 encircled by dotted circles to show that these numbers appear on the other face of the sheet.

The present invention provides the lower edge of the map bearing sheet with a series of cut out portions so arranged that when the sheet is zigzag folded and viewed as shown in Figure 1 a small number bearing portion of each section both front and back is exposed to view at the bottom as shown in Figure 1, this portion being integral with the remote panel in each section, so that it serves as a finger hold and permits the folded map to be opened directly to any desired map section whether front or back. More specifically, this is accomplished by providing at the lower end of each pair of crease lines 14 and 15 a duplicate pair of cut out portions divided equally between the adjacent panels, such cut out portions regularly increasing in length from right to left as seen in Figure 4.

This series of cut out portions may be said to begin with a pair of cut outs of zero length at the lower end of rightmost crease line 15 and the outer edge of panel 13, there being no cut outs at the foot of these lines; this is followed by the smallest pair of cut outs 16, 17 at the foot of the next pair of crease lines 14, 15; a next larger pair of cut outs 18, 19 at the foot of the next pair of crease lines 14, 15; a next larger pair of cut outs 18, 19 at the foot of the next pair of crease lines; and so on through cut outs 20, 21, 22, 23, 24, 25 and then the last or longest cut out 26 near the outer edge of cover panel 12.

The first pair of cut outs 16, 17, are each approximately a half-inch in length along the edge, so that when the chart is folded and viewed as in Figure 1 they provide windows or openings for exposing to view the numbers 11 and 1 respectively, of the rearmost front and back sections. The cut out portions 18 and 19 are each a half-inch longer and expose to view the numbers 10 and 2; and so on. Thus by the means of the series of cut outs at the bottom of the crease lines, the chart when folded exposes to view indicia bearing portions of all sections which permit the ready turning of the map to any desired section.

Now turning again to Figure 4, it will be seen that the cut out portions previously described serve to form a series of tabs one on each panel. These tabs, beginning with the cover panel 12 which has a relatively small tab 30 dependent from its bottom near its middle, increase in size regularly, the increase alternating from one side to the other. Thus tab 32 registers with tab 30 on the left but projects therefrom to the right, thereby exposing an indicia bearing portion 42. Tab 33 registers with tab 32 on the right but projects beyond it on the left to provide an exposed indicia bearing portion 43. The same is true of the remaining tabs 34 to 40 until the last panel is reached which has no cut out portion but which nevertheless provides an exposed indicia bearing portion.

Thus when holding the folded map with the cover panel facing the user a series of index numbers corresponding to the bottom section numbers of the map are exposed to view along the bottom edge. These numbers appear in two groups, one to the left of tab 30, and the other group to the right of tab 30. The manner of use of these tabs and section numbers becomes apparent to the user upon mere inspection. When he desires to inspect a selected section he merely holds the map with his thumb over the selected number and permits the overlying portion of the map to turn as a unit to the right or left and the selected section is exposed to view.

Maps are commonly divided into reference squares by a coordinate system of notation commonly a letter series along one dimension and a number series along the other dimension. This system of notation is employed in the present map. Thus one or both horizontal edges of the present map will bear one of these coordinate indicia 45 shown herein as letters of the alphabet. The vertical coordinate system of notation is in the present map repeated in each section and preferably along the fold lines 14 and 15 in the form of somewhat enlarged digits screen printed so that the same do not interfere with the remainder of the map and may be readily overprinted. These are shown at 46.

Thus every portion of the map may be identified or located by the customary gridiron notational system together with the section number.

The cover face of the map should preferably have an index of the map. The drawings herein show two such indexes of different types. Index 50 consists of a condensed and schematic reproduction of the whole map which is divided into numbered sections 51, these numbers corresponding to the numbers appearing in the indicia along the bottom edge of the panel. When the map shows a route map such as a route map of a commercial air flight the index maps 50 may also designate each section of the map by the time of the flight. Thus the indicia 52 along the top edge of the index map 50 indicate each section by half hour intervals from beginning of flight. This index therefore correlates the tab or section numbers with the time elapsed since the start of the flight and thus makes it possible for the traveler to turn to the section of the map which corresponds to the portion of the route the plane is passing.

The index 60, shown on the cover panel, is of the conventional type of index in that it contains an alphabetical list of places and each such plane name bears against it a notation which gives the section number and the letter and number of the map gridiron. By the aid of the index tabs the desired section is immediately exposed to view and the place is readily located by the aid of the letters and numbers 45 and 46.

The present specification and drawings show the embodiment of the present invention in a folded map. It will be understood however that the invention is applicable and may be employed with many other types of charts containing a variety of information, such as plans, graphs, surveys, designs, time tables, diagrams, drawings and the like and many other types of printed matter.

Having described the invention, we claim:

1. A chart having vertical crease lines for zigzag folding, said crease lines forming a plurality of panels and dividing each face of the chart into a plurality of sections, each section comprising a pair of adjacent panel faces folding over each other, the lower edge of the chart having cut out portions at the foot of each crease line equally divided by the crease line, an adjacent pair of cut out portions being equal and smaller than the pair of cut outs to its one side and greater than the pair of cut outs to the other side and a tab integral with each panel, each tab being greater than the tab to one side and smaller than the tab to the other side, the tab increment projecting alternately to one side and to the other side, said increments serving to receive imprinted indicia identifying the sections; the tab increments projecting to one side serving to identify and locate the sections on one face and the tab increments projecting to the other side serving to identify and locate sections on the other face of the chart.

2. A chart having vertical crease lines for zigzag folding, said crease lines forming a plurality of panels and dividing each face of the chart into a plurality of sections, each section comprising a pair of adjacent panel faces folding over each other, the lower edge of the chart having cut out portions at the foot of each crease line, an adjacent pair of cut out portions being equal and smaller than the pair of cut outs to its one side and greater than the pair of cut outs to the other side and a tab integral with each panel, each tab being greater than the tab to one side and smaller than the tab to the other side, the tab increment projecting alternately to one side and to the other side, said increments serving to receive imprinted indicia identifying the sections.

3. A sheet having a chart printed on both faces, the chart having crease lines for zigzag folding which divide each face of the sheet into a series of sections each composed of a pair of panels facing each other when the chart is folded, each panel having an integral tab dependent from its lower edge, each succeeding tab having a greater dimension edgewise of the panel than the preceding tab and having a portion exposed to view when the chart is folded, the exposed portions being disposed alternately to the right or left of the preceding tab, such exposed portions bearing indicia identifying said map sections, and serving as finger holds in turning the chart to selected sections; said exposed portions being divided into two groups of successive exposed portions, one of these groups serving to identify the sections on one face of the sheet and the other group for the other face of the chart.

4. A sheet having a chart printed on both faces, the chart having crease lines for zigzag folding which divide each face of the sheet into a series of sections each composed of a pair of panels facing each other when the chart is folded, each panel having an integral tab dependent from its lower edge, each succeeding tab having a greater transverse dimension than the preceding tab and having a portion exposed to view when the chart is folded, the exposed portions being disposed alternately to the right or left of the preceding tab, such exposed portions bearing indicia identifying said map sections, and serving as finger holds in turning the chart to selected sections.

BENJAMIN SPECTER.
JAMES J. MURRAY.

REFERENCES CITED

The following references are of record in the file of this patent:

UNITED STATES PATENTS

| Number | Name | Date |
| --- | --- | --- |
| 960,693 | Perrine | June 7, 1910 |
| 2,264,119 | Lichter | Nov. 25, 1941 |